Patented Jan. 1, 1952

2,580,662

UNITED STATES PATENT OFFICE 2,580,662

GLASSES OF HIGH RESISTIVITY AND LOW DIELECTRIC LOSSES

André Danzin, Paris, France, assignor to Compagnie Generale de Telegraphie Sans Fil, a corporation of France No Drawing. Application March 30, 1949, Serial No. 84,480. In France April 23, 1948

3 Claims. (Cl. 106—54)

The volume resistivity of mineral glasses varies enormously with their chemical composition, since it is not uncommon to find glasses which, at 200° C., still have a higher resistivity than $10^{12}$ ohms per sq. cm. per cm. and others which, at the same temperature, have a lower resistivity than $10^6$ ohms per sq. cm. per cm.

The same is the case with the dielectric losses, which are characterised by the value of tan δ, δ being the loss angle. For certain glasses, at 20° C. and for frequencies of the order of a megacycle, the value of tan δ reaches and even exceeds $100.10^{-4}$. At higher frequencies, of the order of 5 megacycles, the value of tan δ varies but little with the frequency, or slightly increases when the frequency increases. On the other hand, at low frequencies, the value of tan δ decreases in general very rapidly with the frequency, owing to the ionic conductivity of glass.

Apart from the above electric properties, various other physical properties have also to be taken into consideration in the manufacture of a glass: homogeneity of the mass of molten glass before shaping, aptitude for being worked, resistance to devitrification, mechanical strength, resistance to chemical agents, and so forth.

It is known that the electric properties of glasses are improved by reducing their alkaline oxide content and by replacing such oxides generally by oxides of heavy elements such as lead or barium. But the greatest drawback of this method is that it renders the glass difficult to melt and to shape.

It is also known that glasses of the $SiO_2$, PbO, $K_2O$ type have good dielectric properties and a satisfactory aptitude for all methods or shaping. But the properties of such glasses are poor as regards their direct current resistivity, and their dielectric losses have a tendency to increase with the frequency for frequencies above one megacycle.

The present invention relates to a range of compositions of glasses which have particularly satisfactory dielectric properties, without impairing their other physical properties of which they also have a sufficient degree.

The glasses according to the invention are characterised by the composition range which is defined as follows:

| | Percent |
|---|---|
| $SiO_2$ | 45 to 50 |
| $K_2O$ | 8 to 12 |
| $CaO+SrO+BaO$* | 30 to 36 |
| MgO | 0 to 3 |
| $B_2O_3$ | 4 to 7 |
| Various | 0. to 1 |

* The relative proportions of CaO, SrO, BaO, being indifferent, for instance the composition may include 30–36% BaO without CaO and SrO, these three oxides being here regarded as physically and chemically equivalent.

with a complete absence of the oxides $Na_2O$, $Al_2O_3$, ZnO and PbO which have a very unfavorable effect on the desired properties, since it is found that the electric resistivity of glasses increases, roughly, with the sum of the contents of $SiO_2$, $Na_2O$ and $Al_2O_3$. It is consequently advantageous to reduce this sum as much as possible. But it is not possible to decrease to too great an extent the silica $SiO_2$ content without running the risk of obtaining a glass which is easily devitrifiable or very difficult to shape owing to too sudden a variation of its viscosity for a small difference of temperature. The best course is therefore to eliminate completely the two oxides $Na_2O$ and $Al_2O_3$ from the composition of the glass. Although to a lesser extent, the presence of zinc oxide ZnO also tends to act in the same unfavorable manner as the presence of $Na_2O$ and $Al_2O_3$, so that it is also neccessary to eliminate it.

Finally, it has been found that the presence of lead oxide PbO has the effect of producing a marked tendency for the dielectric losses to increase when the frequency is increased above one megacycle. For the use of glasses for high-frequency purposes it is therefore also advantageous to eliminate the lead oxide from such glasses.

On the other hand, contrary to the ideas generally expressed regarding the function of alkali oxides, the oxide $K_2O$ acts very favorably in the presence of high alkaline-earth contents and medium boric oxide contents. It is even advantageous to increase to the maximum the $K_2O$ content of the glass, while nevertheless remaining within the limits permitted by the increase of expansion due to its presence, since such increase would impair the resistance of the glass to the impact of heat.

Moreover, boric oxide, the presence of which tends to enhance this favorable action of $K_2O$, must not be present in excess in the composition, since such an excess decreases the level of workability of the glass which in that case becomes very brittle and has a great tendency to harden, thereby impairing its resistance to the impact of heat.

As regards magnesia MgO in the composition, it merely acts to adjust the value of the softening temperatures of the glass, or to prevent the devitrification and facilitate the melting, the refining and the viscosity thereof at the temperatures of operation.

The most essential characteristic property of the types of glasses according to the composition of the invention is that their dielectric losses decrease when the frequency increases, which enables them to be used in particular in most radio applications in which very high frequency currents are involved.

By way of a non-limitative example, the following is a glass composition according to the invention:

| | Percent |
|---|---|
| SiO₂ | 48.3 |
| K₂O | 9 |
| CaO | 3 |
| BaO | 32 |
| MgO | 2 |
| B₂O₃ | 5.1 |
| As₂O₃ | 0.6 | the physical properties of which may be summarized by the following figures:

Resistivity at 200° C. $10^{13}$ ohms per sq. cm. per cm.
Temperature for which the volume resistivity of the glass is 100 megohms per sq. cm. per cm.:

$$T_k\ 100 = 452°\ C.$$

Dielectric loss coefficients:
    For 1 megacycle _____ $\tan \delta = 12.10^{-4}$
    For 10 megacycles _____ $\tan \delta = 7.10^{-4}$
Coefficient of expansion _____ $95.10^{-7}$
Solubility in water (powder method) __ 28 mgm.

What I claim is:

1. Glasses which are more particularly intended for high-frequency tubes and which consist of: potassium oxide (K₂O), the content of which is between 8 and 12% of the total weight, barium oxide, the content of which is between 30 and 36% of the total weight, boric oxide, the content of which is between 4 and 7% of the total weight, silicon oxide, the content of which is between 45 and 50% of the total weight, magnesium oxide, the content of which is lower than 3% of the total weight, and various fluxes about 1%.

2. Glass comprising:

| | Percent |
|---|---|
| Silica | 48.3 |
| Potassium oxide | 9 |
| Barium oxide (BaO) | 32 |
| Calcium oxide (CaO) | 3 |
| Magnesium oxide (MgO) | 2 |
| Boric oxide (B₂O₃) | 5.1 |
| Arsenic oxide (As₂O₃) | 0.6 |

3. Glasses consisting of:

| | Percent |
|---|---|
| Silicon oxide SiO₂ | 45–50 |
| Potassium oxide K₂O | 8–12 |
| Alkaline earth oxides CaO, BaO, SrO with indifferent relative proportions | 30–36 |
| Magnesia MgO | 0–3 |
| Boric oxide B₂O₃ | 4–7 |
| Various fluxes | 0–1 |

ANDRÉ DANZIN.

REFERENCES CITED

The following references are of record in the file of this patent:

UNITED STATES PATENTS

| Number | Name | Date |
|---|---|---|
| Re. 23,049 | Armistead | Nov. 23, 1948 |
| 2,429,432 | Stanworth | Oct. 21, 1947 |